United States Patent
Neuman et al.

(10) Patent No.: US 6,911,191 B2
(45) Date of Patent: Jun. 28, 2005

(54) ONE-STEP OXIDATION OF WET-PROCESS PHOSPHORIC ACID

(75) Inventors: Daniel Carl Neuman, Soda Springs, ID (US); Russell Dean Alcorn, Soda Springs, ID (US); Bryce Richard Carpenter, Soda Springs, ID (US)

(73) Assignee: Agrium U.S. Inc., Denver, CO (US)

( * ) Notice: Subject to any disclaimer, the term of this patent is extended or adjusted under 35 U.S.C. 154(b) by 203 days.

(21) Appl. No.: 10/281,065

(22) Filed: Oct. 25, 2002

(65) Prior Publication Data

US 2004/0081608 A1 Apr. 29, 2004

(51) Int. Cl.$^7$ ............................................. C01B 25/234
(52) U.S. Cl. ................................................. 423/321.1
(58) Field of Search ........................................ 423/321.1

(56) References Cited

U.S. PATENT DOCUMENTS 4,420,321 A * 12/1983 Wilson .......................... 71/43
4,808,391 A * 2/1989 Leavitt et al. ........... 423/321.1

* cited by examiner

*Primary Examiner*—Stanley S. Silverman
*Assistant Examiner*—Maribel Medina
(74) *Attorney, Agent, or Firm*—TraskBritt

(57) ABSTRACT

A one-step method for production of green-colored, stabilized wet-process phosphoric acid in which black-colored, wet-process phosphoric acid containing incidental metallic impurities and a carbonaceous content of less than 1000 ppm is oxidized to produce a green-colored liquid having a carbonaceous content less than 500 ppm. A typical green-colored liquid product produced by this one-step process has an emf of greater than 800 mv.

17 Claims, 1 Drawing Sheet

ONE-STEP OXIDATION OF WET-PROCESS PHOSPHORIC ACID

BACKGROUND OF THE INVENTION

1. Field

This invention relates to green-colored, wet-process phosphoric acid suitable for ammoniation into liquid fertilizer and to processes for producing same.

2. State of the Art

Various techniques and the desirability of producing a green-colored, wet-process phosphoric acid are described in U.S. Pat. No. 4,808,391 to Leavitt. The problems of processes prior to Leavitt are discussed therein with reference to carbon elimination and the minimization of sludge formation in the ammoniated product. Leavitt described a two-step oxidation/reduction process to produce an acceptable green-colored, liquid wet-process phosphoric acid suitable for ammoniation into a green-colored liquid fertilizer. Such green-colored ammonium phosphate liquid fertilizer had become the standard in the industry prior to utilization of wet-processes. Prior process has used calciners to minimize carbon and produce a processed ore suitable for dissolution and production of green-colored phosphoric acid.

The green color of the phosphoric acid is generally postulated to be due to certain incidental metal impurities which exist as chromophores as a result of the oxidation of the wet-process phosphoric acid. When ammoniated, the green-colored phosphoric acid produced a green colored liquid fertilizer which had become the acceptable standard in the industry.

Leavitt indicates that a one-step process described by Moore in Canadian Pat. 955,033 did not produce a wet-process acid with a desirable green color.

BRIEF SUMMARY OF THE INVENTION

A unique one-step process for converting black-colored, wet-process phosphoric acid to a green-colored stable product has been developed.

Black, wet-process phosphoric acid having a $P_2O_5$ content of about 30% by weight to about 75% by weight and a carbon content of less than about 1000 ppm, and preferably less than about 750 ppm, is contacted with an oxidizing agent, e.g., a chloride or nitrogen-containing oxidizing agent, at a temperature of generally less than about 400° F. for a time sufficient to convert the black, wet-process phosphoric acid to a green-colored product suitable for ammoniation into a useful green-colored liquid fertilizer. No further process steps are generally required to obtain the desired green-colored phosphoric acid.

The process is especially effective in treating black, wet-process acid wherein the ore is derived from sources having a relatively low carbon content, e.g., phosphate ores from the western United States, and, in particular ores from Wyoming and Idaho.

The black-colored, wet-process acid derived from such low carbon ores have a carbon content typically below 1000 ppm, more generally below 750 ppm and frequently below 500 ppm. Such black-colored, wet-process phosphoric acid can be treated with nitric acid, for example, at a concentration of about ten pounds nitric acid per 6,000 pounds of wet black-colored phosphoric acid at a temperature generally ranging between about 325° F. to 375° F. for a period of about one-half hour to about twelve hours to produce a green-colored, stable, wet-process phosphoric acid liquid with an emf generally above about 800 mv and typically above about 875 mv with a maximum light transmittance between about 510 to about 540 nm and a carbon content less than about 500 ppm and typically below about 350 ppm. The nitric acid concentration may vary from about 0.1% by weight to about 1% by weight based upon weight of P205 present in wet process acid. Also, lower amounts of oxidizing agent may be used when the carbon content of the dark-colored wet-process phosphoric acid is present in lower concentrations.

No subsequent reduction step has been found to be necessary for the light-green colored product produced according to the low-temperature, one-stage oxidation process of the instant invention.

DETAILED DESCRIPTION OF THE INVENTION

Figure 1:
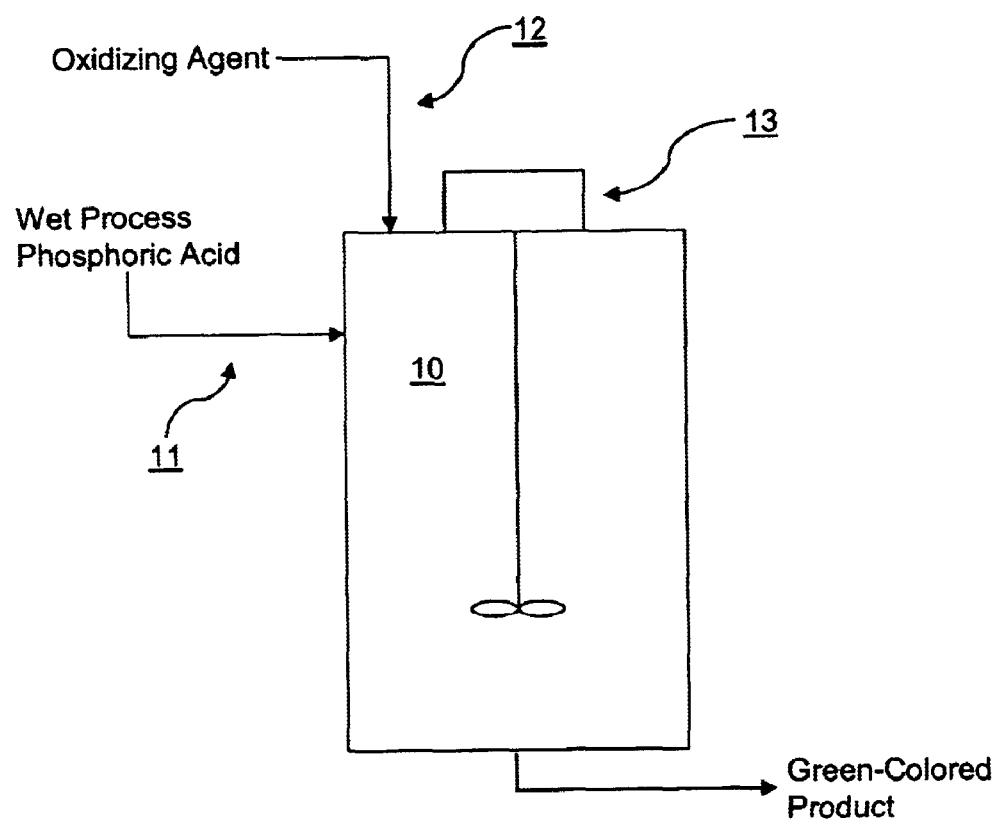
FIG. 1 is a simplified process flow diagram for a batch or continuous operation.

FIG. 1 is a simplified process flow diagram for a batch operation wherein a heated reactor 10 has wet-process black-colored phosphoric acid stream 11 introduced into it along with an appropriate amount of an oxidizing agent stream 12. The reactor is equipped with an agitator 13. The mixture is agitated for a sufficient amount of time until the liquid within the reactor attains a light-green color equivalent to that obtained by the processing of calcined ore to a standard phosphoric acid product for conversion to ammoniated fertilizer. The residence time is typically about one-half to about three hours depending upon the oxidizable carbon content of the feed, quantity of the feed, the quantity of oxidizing agent utilized and reactor temperature. Reactor temperatures are generally between about 300° F. and about 400° F. Preferred temperatures are between about 325° F. and 375° F. The appropriate end-point is determined by periodic samplings of the reactor content to determine the appropriate color and the desired emf.

In a continuous process, the black, wet-process phosphoric acid, which typically has been suitably diluted, is fed continuously into an oxidation reactor. An oxidizing agent, e.g., $HNO_3$ is also fed continuously into the reactor.

The volume of the reactor is determined by the rate of phosphoric acid and oxidizing agent fed into the reactor and the reaction rate. The residence time of the reactants must be sufficient to cause the reaction product to reach its desired end point.

Assuming a reaction time of one hour, a minimal reactor volume of 10,000 gal. is required to produce 10,000 gals./hr. of green phosphoric acid.

The wet-process, black-colored phosphoric acid feed material is produced by a conventional wet-process utilizing raw, uncalcined ore having a relatively low carbon content. The wet process acid has a TOC (total oxidizable carbon) content of less than 1000 ppm, more typically less then 750 ppm and often as low as 500 ppm. Also present are incidental metal impurities such as magnesium, iron, vanadium, chromium and similar metals capable of having different valence states and generally regarded as chromophores when present in a liquid at certain valence states. The green color of the final product of this invention may be attributed to such metals in certain oxidation states.

An advantage of the instant invention is its effectiveness in utilizing uncalcined western ores which are naturally low in total oxidizable carbon content so that the one-step oxidizing process of the instant invention can readily be employed to produce a green-colored phosphoric acid having an especially low carbon content, which makes such product readily suitable for ammoniation into a commercially desirable liquid fertilizer product.

Preferred oxidizing agents are alkali metal chlorates, nitric acid and ammonium nitrate. Nitric acid has demonstrated particularly good oxidizing characteristics with minimal off-gassing of $NO_x$ gases, which is an advantageous feature of the instant invention and an unexpected characteristic in view of prior process conditions.

A further advantage is that a calcination step may be eliminated. Calcination is generally expensive and causes undesirable off-gases, such as $CO_2$, CO, $NO_x$, $SO_2$ and the like. Calcination off-gases are being subject to increasingly strict governmental regulation. Also, objectionable fine particulate matter may be present in such off-gases.

EXAMPLE I

Wet-process, black-colored phosphoric acid having a $P_2O_5$ content of about 69% by weight was treated with nitric acid at a dosage of 10 lbs. nitric acid as $HNO_3$ per ton of $P_2O_5$ content. The SPA oxidation reactor was operated at a temperature of about 335° F. to 375° F. until the proper light-green colored reaction mixture was obtained. Only a single stage of oxidation was conducted with the light-green colored product having an emf of about 930 mv. The TOC content was reduced from about 500 ppm in the black-colored phosphoric acid feed to less than about 300 ppm in the green-colored product. The light transmittance of the green-colored product was predominantly between 510 nm and 540 nm.

Similar results are attainable when ammonium nitrate is substituted as the oxidizing agent for nitric acid in the above example.

EXAMPLE II

Black, wet-process phosphoric acid having a $P_2O_5$ content of 69% by weight and TOC of about 500 ppm was fed to a reactor at a flow rate equivalent to 200,000 $P_2O_5$ tons per year. Sodium chlorate ($NaClO_3$) was also fed to the reactor at a flow rate of 1,000 tons per year with $NaClO_3$ content of 60% by weight.

The reactor was operated at a temperature of 350° F. and at a pressure of 11.7 psia. The equivalent working volume of the reactor was 5,000 gallons and the residence time of the material in the reactor was about 62.5 minutes.

A light-green colored phosphoric acid product having a $P_2O_5$ content of 68.7% by weight and a TOC of about 300 ppm was produced. The specific gravity of the product was about 1.975.

Some precipitates of various metal compounds, e.g. MnO and MgO (magnesium pyrophosphate) are generally present in the green-colored product of the instant invention and are removed by filtration. Also present and generally removable by filtration are gypsum, zinc pyrophosphate, nickel pyrophosphate and phosphate and oxides of other polyvalent metals. Higher valence (>+2) states of manganese generally do not precipitate.

Precipitation is aided by allowing the green-colored product to stand, i.e., allow fine solids to precipitate over a period of time. The aging period may be brief, a few hours, up to several days. The aging period may be aided by maintaining the green-colored product at an elevated temperature. The temperature may range from ambient up to about 400° F.

A further significant advantage of the instant invention is that very minor, essentially negligible, $NO_x$ emissions are found in the oxidation reactor off-gases when the reactor is controlled at proper EMF levels, as set forth herein.

The millivolt readings set forth herein utilizes an Orion ORP probe and is standardized with a solution 967901, which is a 420 mv standard when measured with a normal hydrogen electrode at 25° C. However, the measurements reported herein were made with a standard platinum ORP and silver/silver chloride reference electrode which reads the standard solution at 220 mv. All samples were diluted with demineralized water to 28–30% $P_2O_5$ prior to application of the electrode. The emf values reported herein are different than if they were determined by standardization to a potassium dichromate standard such as those reported in Leavitt. However, no drift was experienced with the Orion probe and standardization to the silver/silver chloride standard.

The green-colored phosphoric acid produced by the process of the instant invention was ammoniated into a clear light green-colored liquid fertilizer product which was storage-stable with no sludge-forming material evident. The ammoniated product was equivalent to ammoniated liquid fertilizer formed from green-colored phosphoric acid derived according to prior phosphoric acid processes which treated calcined phosphate ores.

What is claimed is:

1. A method for making a green-colored, stabilized wet-process phosphoric acid comprising:

providing a black-colored wet-process phosphoric acid having a $P_2O_5$ content of from 30% by weight to about 75% by weight which contains incidental metallic impurities and a total carbonaceous content of less than about 1000 ppm;

oxidizing said wet-process phosphoric acid at a temperature less than 400° F. with a chloride- or nitrogen-based oxidizing agent, said oxidizing of said wet-process phosphoric acid being conducted until a clear green-colored liquid product is obtained with a carbonaceous content less than 500 ppm.

2. The method of claim 1, wherein the temperature is less than about 375° F.

3. The method of claim 1, wherein the wet-process phosphoric acid has a carbonaceous content of less than about 500 ppm.

4. The method of claim 3, wherein said green-colored liquid has a carbonaceous content of less than about 350 ppm.

5. The method of claim 1, wherein said green-colored liquid has an emf greater than about 800 mv.

6. The method of claim 1, wherein said oxidizing agent is selected from the group consisting of nitric acid, ammonium nitrate and an alkali metal chlorate.

7. The method of claim 1, wherein the oxidizing agent is a nitrogen-based oxidizing agent.

8. The method of claim 1, wherein the oxidizing agent is nitric acid.

9. The method of claim 1, wherein the oxidizing agent is ammonium nitrate.

10. The method of claim 1, wherein the oxidizing agent is sodium chlorate.

11. The method of claim 1, wherein said green-colored liquid has an emf greater than about 875 mv.

12. The method of claim 1, wherein at least a portion of the incidental metallic impurities present undergo oxidation to a higher valence state during oxidation of the wet phosphoric acid.

13. The method of claim 1, wherein the green-colored liquid has a peak light transmittance between the range of about 510 nm to about 540 nm.

14. The method of claim 1, wherein said oxidizing of said wet-process phosphoric acid is conducted for a period from about one-half hour to about twelve hours.

15. The method of claim 1, wherein the green-colored liquid product is filtered.

16. The method of claim 15, wherein the green-colored liquid product is aged prior to filtering.

17. The method of claim 15, wherein the green-colored liquid product is filtered through a filter.

\* \* \* \* \*